US009712787B2

(12) United States Patent
Liu et al.

(10) Patent No.: US 9,712,787 B2
(45) Date of Patent: Jul. 18, 2017

(54) SYSTEM AND METHOD OF DELIVERING VIDEO CONTENT

(75) Inventors: Kuo-Hui Liu, San Ramon, CA (US);
Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1677 days.

(21) Appl. No.: 11/772,785

(22) Filed: Jul. 2, 2007

(65) Prior Publication Data

US 2009/0013362 A1    Jan. 8, 2009

(51) Int. Cl.
| | |
|---|---|
| H04N 7/173 | (2011.01) |
| H04N 21/438 | (2011.01) |
| H04N 21/6405 | (2011.01) |
| H04N 21/643 | (2011.01) |

(52) U.S. Cl.
CPC ..... *H04N 7/17318* (2013.01); *H04N 21/4384* (2013.01); *H04N 21/6405* (2013.01); *H04N 21/64322* (2013.01)

(58) Field of Classification Search
USPC ............................. 725/86, 87, 91, 93–95, 97
See application file for complete search history.

(56) References Cited

U.S. PATENT DOCUMENTS

| | | | | |
|---|---|---|---|---|
| 6,853,639 | B1* | 2/2005 | Watanuki et al. | 370/390 |
| 7,978,698 | B2* | 7/2011 | Yamaguchi et al. | 370/390 |
| 2004/0090970 | A1* | 5/2004 | Sanchez et al. | 370/397 |
| 2006/0126667 | A1* | 6/2006 | Smith et al. | 370/486 |
| 2006/0235800 | A1* | 10/2006 | Furlong et al. | 705/59 |
| 2007/0143808 | A1* | 6/2007 | Agrawal et al. | 725/119 |
| 2007/0286224 | A1* | 12/2007 | Chen et al. | 370/437 |

* cited by examiner

*Primary Examiner* — Jason K Lin
(74) *Attorney, Agent, or Firm* — Toler Law Group, PC (57) ABSTRACT

A system and method of delivering video content is disclosed. In a particular embodiment, the method includes receiving channel selection data from a set-top box device via an Internet Protocol Television (IPTV) access network. The channel selection data indicates a selection of an IPTV channel. The method also includes sending a rapid channel change (RCC) request to a distribution switch/router system via a subscriber virtual local area network (VLAN) associated with the set-top box device after receiving the channel selection data. The RCC request indicates the selected IPTV channel.

33 Claims, 7 Drawing Sheets

SYSTEM AND METHOD OF DELIVERING VIDEO CONTENT

FIELD OF THE DISCLOSURE

The present disclosure is generally related to delivering video content.

BACKGROUND

Television provides information and entertainment to many viewers. New technologies, such as Internet Protocol Television (IPTV), enable service providers to offer a large number of channels that allow viewers to select from a wide variety of programming. Viewers often change channels during commercials, when a program is scheduled to begin, or to find a desired channel. When changing a channel within an IPTV system, a set-top box device or other receiver may wait for the arrival of a particular frame, such as a random access point (RAP) frame, before playing video content. This tuning delay can be exacerbated by other delays, such as decoding time stamp/system target decoder (DTS/STC) delay and buffering delay for lost packet recovery. As a result, after a channel change command is issued, a new channel may not be displayed for a relatively long time. Such a long waiting delay for channel change can be frustrating to viewers, especially when they desire to quickly review the content displayed on multiple channels. Accordingly, there is a need for an improved system and method of delivering video content.

DETAILED DESCRIPTION OF THE DRAWINGS

In a particular embodiment, a system to deliver video content includes an access switch/router system having processing logic and memory accessible to the processing logic. The memory includes instructions executable by the processing logic to receive channel selection data from a set-top box device. The channel selection data indicates a selection of an Internet Protocol Television (IPTV) channel. The memory also includes instructions executable by the processing logic to send a rapid channel change (RCC) request to a distribution switch/router system via a subscriber virtual local area network (VLAN) associated with the set-top box device. The RCC request indicates the selected IPTV channel.

In another particular embodiment, a system of delivering video content includes a distribution switch/router system having processing logic and memory accessible to the processing logic. The memory includes instructions executable by the processing logic to receive a rapid channel change (RCC) request from an access switch/router system via a subscriber virtual local area network (VLAN) associated with a set-top box device. The RCC request indicates a selection of an IPTV channel at the set-top box device. The memory also includes instructions executable by the processing logic to send a RCC stream to the access switch/router via the subscriber VLAN. The RCC stream includes video data packets associated with the selected IPTV channel.

In a particular embodiment, a system of delivering video content includes a residential gateway system having processing logic and memory accessible to the processing logic. The memory includes instructions executable by the processing logic to receive first channel selection data from a first set-top box device. The first channel selection data indicates a selection of an Internet Protocol Television (IPTV) channel. The memory also includes instructions executable by the processing logic to forward the first channel selection data to an access switch/router system via an IPTV access network. The access switch/router system is adapted to send a rapid channel change (RCC) request to a distribution switch/router system via a subscriber virtual local area network (VLAN) associated with the subscriber of the first set-top box device after receiving the first channel selection data. The RCC request indicates the selected IPTV channel.

In another particular embodiment, a method of delivering video content includes receiving channel selection data from a set-top box device via an Internet Protocol Television (IPTV) access network. The channel selection data indicating a selection of an IPTV channel. The method also includes sending a rapid channel change (RCC) request to a distribution switch/router system via a subscriber virtual local area network (VLAN) associated with the set-top box device after receiving the channel selection data. The RCC request indicates the selected IPTV channel.

In a particular embodiment, a method of delivering video content includes receiving a rapid channel change (RCC) request from an access switch/router system via a subscriber virtual local area network (VLAN) associated with the subscriber of the set-top box device. The RCC request indicates a selection of an Internet Protocol Television (IPTV) channel at the set-top box device. The method also includes sending an RCC stream to the access switch/router system via the subscriber VLAN. The RCC stream includes video data packets associated with the selected IPTV channel stored at the distribution switch/router system.

In another particular embodiment, a computer-readable medium includes instructions executable by a processor to perform a method including receiving channel selection data from a set-top box device via an Internet Protocol Television (IPTV) access network. The channel selection data indicates a selection of an IPTV channel. The computer-readable medium also includes instructions executable by the processor to send a rapid channel change (RCC) request to a distribution switch/router system via a subscriber virtual local area network (VLAN) associated with the set-top box device. The RCC request indicates the selected IPTV channel.

Figure 1:
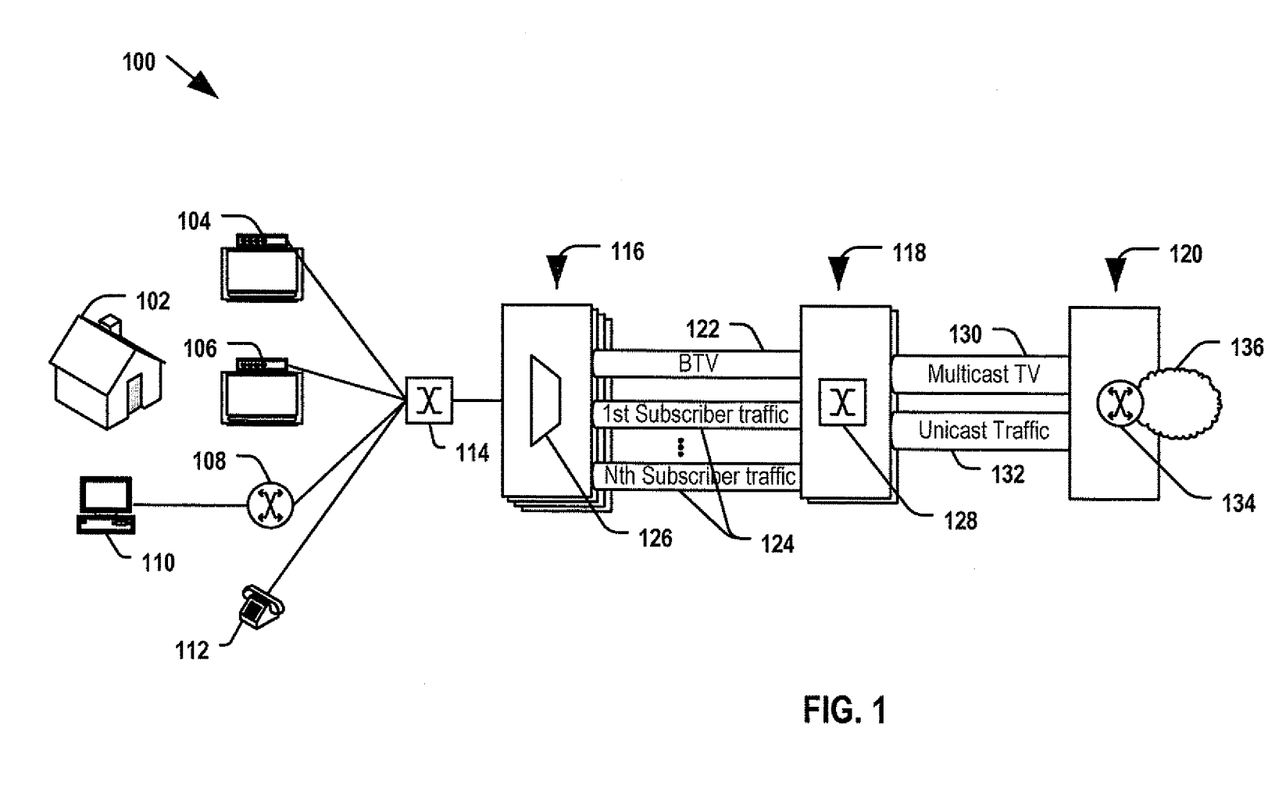
FIG. 1 is a diagram of a first particular embodiment of a system to deliver video content.

Referring to FIG. 1, a first particular embodiment of a system to deliver video content is illustrated and designated generally 100. The system 100 includes a distribution switch/router system 128 at a central office 118. The distribution switch/router system 128 receives video data via a multicast television stream 130 from a second distribution switch/router 134 at an intermediate office 120. The multicast television stream 130 includes Internet Protocol (IP) data packets addressed to a multicast IP address associated with a television channel. The distribution switch/router system 128 may cache data associated with each television channel received from the intermediate office 120 in a first-in first-out (FIFO) cache.

The distribution switch/router system 128 also receives unicast data traffic from the intermediate office 120 via a unicast traffic stream 132. The unicast traffic stream 132 includes data packets related to devices located at a particular residence, such as the residence 102. For example, the unicast traffic stream 132 may include data traffic related to a digital subscriber line, a telephone line, another data connection, or any combination thereof. To illustrate, the unicast traffic stream 132 may communicate data packets to and from a telephone 112 associated with a subscriber at the residence 102. The telephone 112 may be a Voice over Internet Protocol (VoIP) telephone. To further illustrate, the unicast traffic stream 132 may communicate data packets to and from a personal computer 110 at the residence 102 via one or more data routers 108. In an additional illustration, the unicast traffic stream 132 may communicate data packets to and from a set-top box device, such as the set-top box devices 104, 106. The unicast traffic stream 132 may communicate data packets to and from the devices located at the residence 102 via one or more residential gateways 114 associated with the residence 102.

The distribution switch/router system 128 may send data to one or more access switch/router systems 126. The access switch/router system 126 may include or be included within a service area interface 116. In a particular embodiment, the access switch/router system 126 may include a digital subscriber line access multiplexer (DSLAM). The access switch/router system 126 may receive data from the distribution switch/router system 128 via a broadcast television (BTV) stream 122 and a plurality of unicast subscriber traffic streams 124. The BTV stream 122 can be used to communicate video data packets associated with a multicast stream. For example, the BTV stream 122 may include a multicast virtual local area network (VLAN) connection between the distribution switch/router system 128 and the access switch/router system 126. Each of the plurality of subscriber traffic streams 124 can be used to communicate subscriber specific data packets. For example, the first subscriber traffic stream can communicate data related to a first subscriber, and the nth subscriber traffic stream can communicate data related to an nth subscriber. Each subscriber to the system 100 may be associated with a respective subscriber traffic stream 124. The subscriber traffic stream 124 may include a subscriber VLAN connection between the distribution switch/router system 128 and the access switch/router system 126 that is associated with a particular set-top box device 104, 106, a particular residence 102, a particular residential gateway 114, another device associated with a subscriber, or any combination thereof.

In an illustrative embodiment, a set-top box device, such as the set-top box device 104, receives a channel change command from an input device, such as a remoter control device. The channel change command may indicate selection of an Internet Protocol Television (IPTV) channel. After receiving the channel change command, the set-top box device 104 generates channel selection data that indicates the selection of the IPTV channel. The set-top box device 104 may send the channel selection data to the access switch/router system 126 via the residential gateway 114. The channel selection data may include an Internet Group Management Protocol (IGMP) Join request. In an illustrative embodiment, the access switch/router system 126 may identify whether it is joined to a multicast group associated with the requested channel based on information in the IGMP Join request.

If the access switch/router system 126 is not joined to the multicast group associated with the requested channel, the access switch/router system 126 may generate a multicast stream request. The multicast stream request may be generated by modifying the received channel selection data. In an illustrative embodiment, the access switch/router system 126 may modify an IGMP Join request to produce a proxy IGMP Join request. The access switch/router system 126 may send the multicast stream request to the distribution switch/router system 128 via the BTV stream 122. Additionally, the access switch/router system 126 may generate a rapid channel change (RCC) request. The access switch/router system 126 may generate the RCC request by modifying the channel selection data. In an illustrative embodiment, the access switch/router system 126 may modify an IGMP Join request to produce the RCC request. The access switch/router system 126 may send the RCC request, via a subscriber traffic stream 124 associated with the set-top box device 104 to the distribution switch/router system 128. If the access switch/router system 126 is joined to the multicast group associated with the requested channel, the access switch/router system 126 may send a RCC request without sending a multicast stream request.

In response to receiving a RCC request, the distribution switch/router system 128 may send a RCC stream associated with the requested channel to the access switch/router system 126 via the subscriber traffic stream 124. The RCC stream may include video data packets stored in a cache of the distribution switch/router system 128. The access switch/router system 126 forwards the cached data packets to the set-top box device 104 to minimize buffering delays associated with changing the channel. In an illustrative embodiment, both the distribution switch/router system 128 and the access switch/router system 126 may send the cached data packets as fast as network conditions will allow the transmission. In an illustrative, non-limiting embodiment, the distribution switch/router system 128 may select a data transmission rate for sending the cached data packets based on a data transmission rate of the multicast stream associated with the requested channel. In response to receiving a multicast stream request, the distribution switch/router system 128 may join the access switch/router system 126 to the multicast group associated with the requested channel and forward data packets of the respective multicast stream to the access switch/router system 126 via the BTV stream 122.

In a particular embodiment, the access/switch router system 126 may merge the data packets of the RCC stream with data packets of the multicast stream. In an illustrative embodiment, the distribution switch/router system 128 may send an end of burst (EOB) indicator to the access switch/router system 126 when the last data packet of the RCC stream has been sent. The access switch/router system 126 may connect the set-top box device 104 to the multicast stream when the EOB indicator is received. In another illustrative embodiment, the access switch/router system 126 may merge the data packets of the RCC stream with the data packets of the multicast stream after a predefined time period has elapsed. The access switch/router system 126 may connect the set-top box device 104 to the multicast stream after the predefined time period has elapsed. In this embodiment, the distribution switch/router tracks expiration of the predefined time from when it receives the RCC request. The distribution switch/router 128 sends all of the packets cached in the caching FIFO associated with the requested channel and all of the packets associated with the requested channel that it receives before the expiration of the predefined time period.

Figure 2:
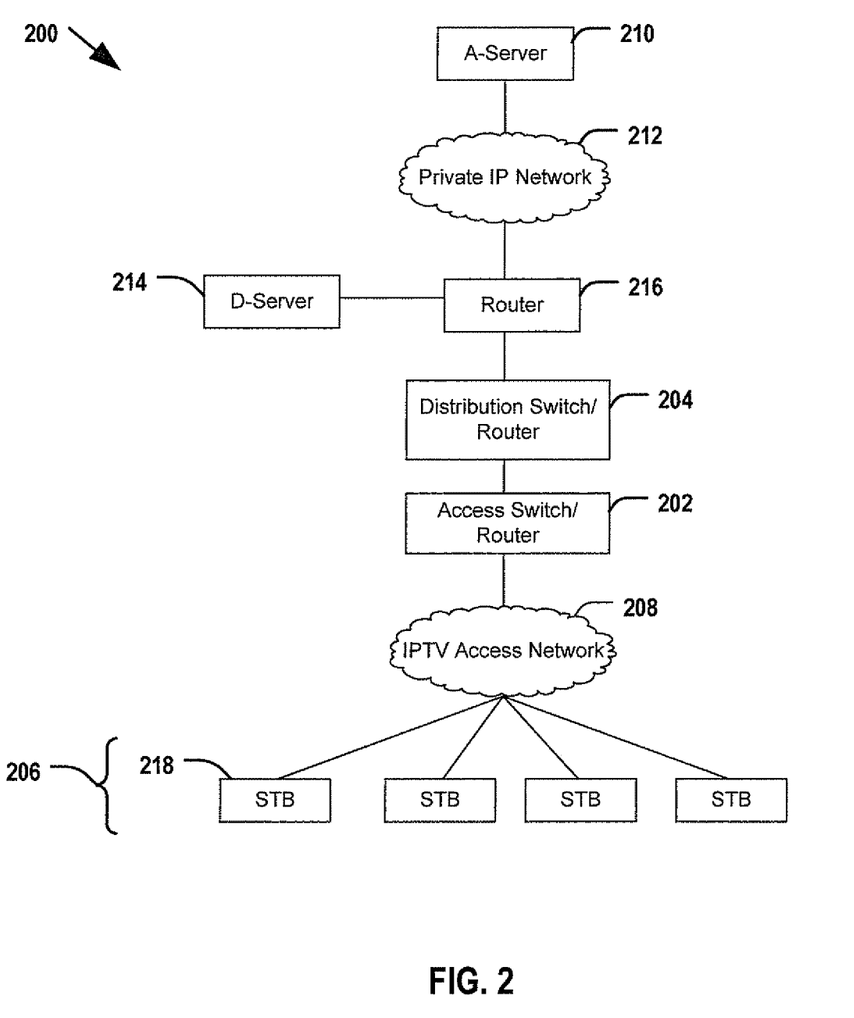
FIG. 2 is a block diagram of a second particular embodiment of a system to deliver video content.

Referring to FIG. 2, a second particular embodiment of a system to deliver video content is illustrated and designated generally 200. The system 200 includes an access switch/router system 202 of an Internet Protocol Television (IPTV) network. The access switch/router system 202 can include one or more servers, one or more routers, one or more switches, or any combination thereof. The access switch/router system 202 communicates with a distribution switch/router system 204, which may be located at a central office facility of the IPTV network. The distribution switch/router system 204 can include one or more servers, one or more routers, one or more switches, or any combination thereof. Further, the access switch/router system 202 communicates with a plurality of set-top box devices 206 via an IPTV access network 208.

The distribution switch/router system 204 receives multicast streams via IP multicasting for streams originated from one or more video content acquisition servers, such as the A-server 210, via a private IP network 212. In an illustrative embodiment, the distribution switch/router system 204 can communicate with the private IP network 212 via a router 216. The router 216 can communicate with a designated server, such as the D-server 214, that handles packet loss events or provides other functions of the IPTV network.

In a particular embodiment, the distribution switch/router system 204 caches recent data associated with a channel originally received from A-servers, such as the A-server 210. For example, the distribution switch/router system 204 can cache data associated with a plurality of channels made available by a service provider to the set-top box devices 206. The distribution switch/router system 204 creates a caching memory to store data associated with each channel. For instance, when the distribution switch/router system 204 is powered up, it can create a separately addressed caching first-in first-out (FIFO) memory (a "caching FIFO") for each channel, in which packets stored first are read out first. The packets can be encapsulated with a multicast group IP address of a channel as the destination IP address and an IP address of the A-Server 210 as the source IP address. The distribution switch/router system 204 can send cached data for an channel to the access switch/router system 202 in response to a request from the access switch/router system 202. The distribution switch/router system 204 can also connect the access switch/router system 202 with a multicast stream sent by the A-server 210 for the channel. The distribution switch/router system 204 may also indicate to the access switch/router system 202 when all of the cached data for the channel has been sent.

Each caching FIFO can be sized to accommodate a configurable amount of data or number of data packets. For instance, the number of data packets can be configured to account for the buffering requirements of random access point (RAP) packets. Each time a multicast packet is received at the distribution switch/router system 204, an additional copy of the packet is created for channel caching. In a particular embodiment, the distribution switch/router system 204 can generate a caching FIFO address based on the multicast group IP address in the destination IP address header of the packet. The generated FIFO address can be used to determine which caching FIFO at the distribution switch/router system 204 stores data associated with the channel corresponding to the received packet. The packet can then be cached at the identified caching FIFO.

In a particular embodiment, the distribution switch/router system 204 may communicate with a rapid channel change device (not shown). The rapid channel change device may communicate with one or more video content acquisition servers, such as the A-server 210, via the private IP network 212. In an illustrative embodiment, the rapid channel change device may communicate with the private IP network 212 via the router 216. The router 216 may communicate with a designated server, such as the D-server 214.

The rapid channel change device may cache recent data associated with channels received from the A-server 210. For example, the rapid channel change device can cache data associated with the channels available from a service provider to the set-top box devices 206. The rapid channel change device may create a caching memory to store data associated with each channel. For instance, when the rapid channel change device is powered up, it may create a caching first-in first-out (FIFO) memory for each channel, in which packets stored first are read out first. The packets can be encapsulated with a multicast group IP address of a channel as the destination IP address and an IP address of the A-Server 210 as the source IP address. The rapid channel change device may send cached data for a channel to the access switch/router system 202, via the distribution switch/router system 204, in response to a request received at the distribution switch/router system 204 from the access switch/router system 202. Once the cached data for the channel is sent to the access switch/router system 202, the distribution switch/router system 204, the rapid channel change device, or any combination thereof, can connect the access switch/router system 202 with a multicast stream sent by the A-server 210 for the requested channel.

The access switch/router system 202 can receive channel selection data from the set-top box devices 206. For example, to change a channel the first set-top box device 218 may send an IGMP Join packet to the access switch/router system 202. The IGMP Join includes the multicast group IP address for the requested channel. When the access switch/router system 202 receives the IGMP Join packet, the access switch/router system 202 extracts the multicast group IP address and determines which channel the set-top box device 206 is requesting. If the access switch/router system 202 is not currently joined to a multicast group associated with a channel requested by a set-top box device 206, the access switch/router system 202 generates a proxy IGMP Join on behalf of the set-top box device 206 and forwards the proxy IGMP Join request to the distribution switch/router system 204 via a multicast virtual local area network (VLAN) connection. The multicast VLAN connection is used for multicast data traffic, and is not associated with a particular set-top box device 206.

Whether or not the access switch/router system 202 is currently joined to a multicast group associated with the requested channel, the access switch/router system 202 can generate a rapid channel change (RCC) request and send the RCC request to the distribution switch/router system 204 via a subscriber virtual local area network (VLAN) connection. The subscriber VLAN connection may be associated with a particular set-top box device, such as the first set-top box device 218. In a particular embodiment, the distribution switch/router system 204 can use a maximum bandwidth available to send RCC data packets to the first set-top box device 218, such that channel change delay can be minimized. In an illustrative embodiment, the distribution switch/router system 204 can determine a data rate for transmission of the RCC data packets based at least partially on a data transmission rate associated with the requested channel.

After the packets cached for a requested channel are sent from the distribution switch/router system 204, the distribution switch/router system 204 may send an end of burst (EOB) indicator to the access switch/network system 202 to specify that all of the cached data packets have been sent to the access switch/network system 202. The access switch/router system 202 may send the cached data received from the distribution switch/router system 204 to the first set-top box device 218 until the EOB indicator is received, and then connect the first set-top box device 218 to the A-server multicast stream. Alternatively, the access switch/router system 202 may send the cached data received from the distribution switch/router system 204 for a predefined time and then connect the first set-top box device 218 to the A-server multicast stream.

Figure 3:
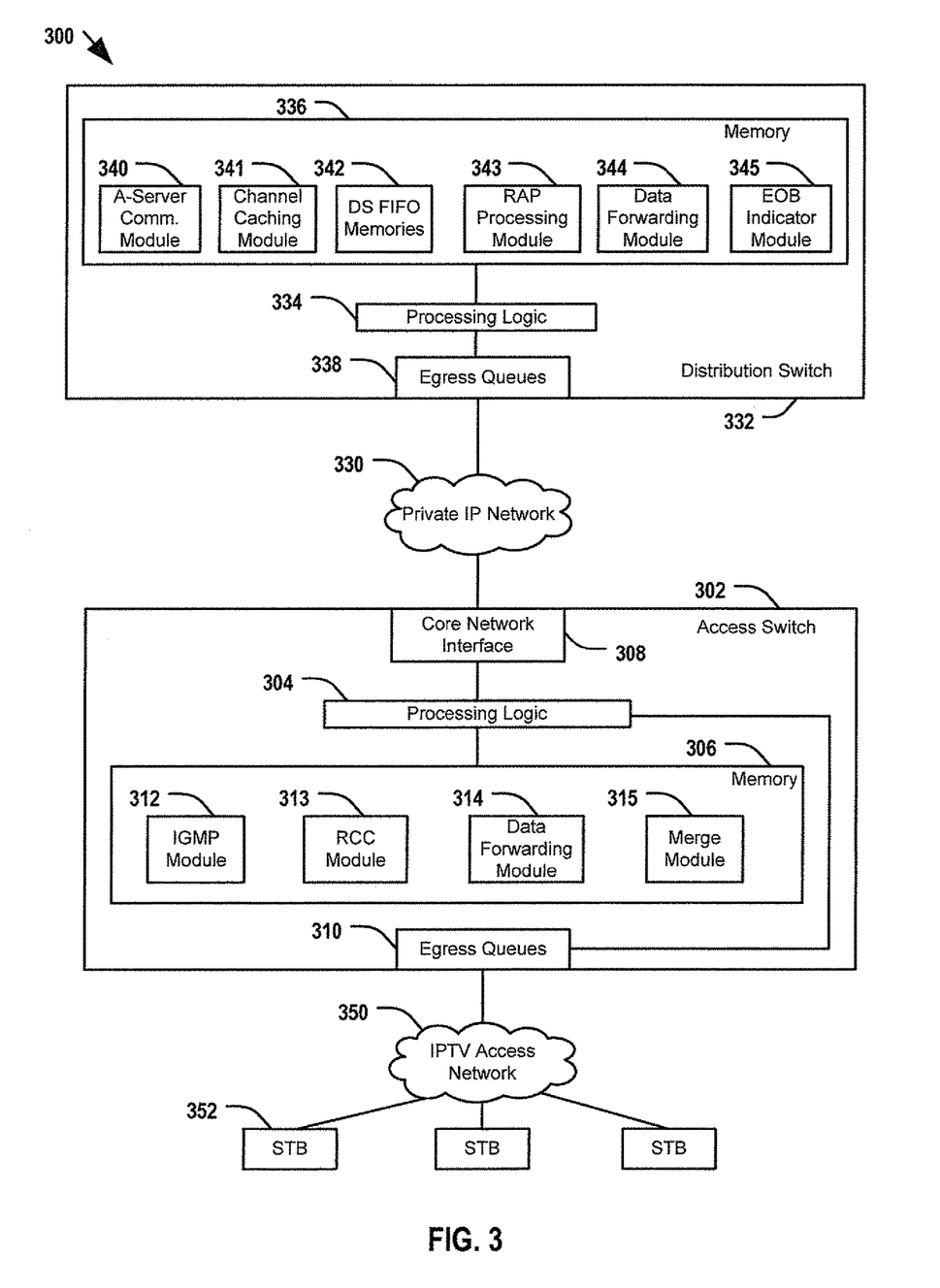
FIG. 3 is a block diagram of a third particular embodiment of a system to deliver video content.

Referring to FIG. 3, a third particular embodiment of a system to deliver video content is illustrated and designated generally 300. The system 300 includes an access switch/router system 302 communicating with a distribution switch/router system 332 via a private Internet Protocol (IP) network 330. The access switch/router system 302 also communicates with a plurality of set-top box devices 352 via an Internet Protocol Television (IPTV) access network 350. The access switch/router system 302 may communicate with the plurality of set-top box devices 352 via at least one residential gateway system (not shown). The access switch/router system 302 includes processing logic 304 and memory 306 accessible to the processing logic 304. In addition, the access switch/router system 302 includes a core network interface 308 to facilitate communication between the access switch/router system 302 and the private IP network 330. Further, the access switch/router system 302 includes a plurality of egress queues 310 that are adapted to communicate video data packets to the plurality of set-top box devices 352 on a per subscriber basis.

As illustrated in FIG. 3, the memory 306 includes a plurality of modules 312-315 that are adapted to provide various functions of the access switch/router system 302. In one embodiment, the modules can include instructions executable by the processing logic 304. Such instructions can be embodied in one or more programs, operating systems, or any combination thereof, adapted to run at the access switch/router system 302. In an alternative embodiment, one or more of the functions provided by the modules 312-315 may be implemented using hardware logic, software instructions, or any combination thereof.

In a particular embodiment, the memory 306 can include, for example, an Internet Group Management Protocol (IGMP) module 312 that is executable by the processing logic 304 to receive and execute channel selection data, such as IGMP Join requests, from the set-top box devices 352. The IGMP Join request may indicate the multicast group IP address for an IPTV channel selected at one of the set-top box devices 352. The IGMP module 312 is executable by the processing logic 304 to extract the multicast group IP address and identify the IPTV channel selected at the set-top box device. In addition, the IGMP module 312 is executable by the processing logic 304 to send a proxy IGMP Join request corresponding to the IPTV channel to the distribution switch/router system 332 on behalf of the set-top box device requesting the IPTV channel. The IGMP module 312 may be executable by the processing logic 304 to generate the proxy IGMP Join request by modifying an IGMP join request received from the set-top box device 352. For example, the type field of the IGMP Join request received from the set-top box device 352 may be changed from 0x16 to 0xFE to produce the proxy IGMP Join request.

The IGMP module 312 may be executable by the processing logic 304 to receive data packets associated with the IPTV channel from the distribution switch/router system 332. The received data packets associated with the IPTV channel may relate to a multicast stream of the IPTV channel or a unicast stream of the IPTV channel.

In a particular embodiment, the memory 306 includes a rapid channel change (RCC) module 313 that is executable by the processing logic 304 to generate and send a RCC request to the distribution switch/router system 332 on behalf of the set-top box device requesting the IPTV channel. The RCC request may include a modified IGMP Join request. Various methods may be used to encode the RCC request. For example, an IGMPv2 type field may be modified from 0x16 to one of the unused code points, such as 0xFE. Other fields of the original IGMPv2 Join packet such as the multicast group IP address field may be unmodified. The RCC module 313 may be executable by the processing logic 304 to send the RCC request to the distribution switch/router system 332 via a subscriber virtual local area network (VLAN). In an illustrative embodiment, the subscriber VLAN may be associated with the particular set-top box device requesting the IPTV channel and the subscriber VLAN may carry only unicast traffic.

In a particular embodiment, the memory 306 includes a data forwarding module 314 that is executable by the processing logic 304 to forward data packets received from the distribution switch/router system 332 to one or more set-top box devices 352. In an illustrative embodiment, the data forwarding module 314 may be executable by the processing logic 304 to receive a multicast stream associated with an IPTV channel via a multicast VLAN. The multicast stream may include data packets of an IPTV channel selected at one of the set-top box devices 352. In another illustrative embodiment, the data forwarding module 314 may be executable by the processing logic 304 to receive a rapid channel change (RCC) stream associated with the IPTV channel via a subscriber VLAN. The RCC stream may include data packets of the IPTV channel selected at the set-top box device. The data forwarding module 314 may be executable by the processing logic 304 to send the data packets of the multicast stream, the RCC stream, or any combination thereof; to the requesting set-top box device via one of the egress queues 310. In another embodiment, the data forwarding module 314 can be executable by the processing logic 304 to stop sending packets to the set-top box device in response to receiving an IGMP Leave packet issued by the set-top box device.

The memory 306 may include a merge module 315 that is executable by the processing logic 304 to stop sending an RCC stream associated with an IPTV channel to a set-top box device and to begin sending a multicast stream associated with the IPTV channel to the set-top box device. In an illustrative embodiment, the merge module 315 may be executable by the processing logic 304 to stop sending the RCC stream in response to receiving an end of burst (EOB) indicator from the distribution switch/router system 332. The EOB indicator may indicate when the last data packet of the RCC stream has been received. After receiving the EOB indicator, the merge module 315 may be executable by the processing logic 304 to connect the set-top box device with a multicast stream associated with the IPTV channel.

In another illustrative embodiment, the merge module 315 may be executable by the processing logic 304 to connect the STB to the multicast stream after a predefined period of time. In an illustrative, non-limiting embodiment, the predefined time period may be based on a number of cached data packets desired to be sent to the set-top box device to minimize channel change delays, an estimate or measurement of a data transmission rate of the multicast stream associated with the requested channel, an estimate or measurement of access switch/router system 302 delays, or any combination thereof. After the predefined period of time has elapsed, the merge module 315 may be executable by the processing logic 304 to connect the access switch/router system 302 with a multicast stream associated with the IPTV channel.

In a particular embodiment, the distribution switch/router system 332 includes processing logic 334 and memory 336 accessible to the processing logic 334. Further, the distribution switch/router system 332 includes a second plurality of egress queues 338 that communicate with access switches, such as the access switch/router system 302, via the private IP network 330. The memory 336 includes a plurality of modules 340-345 that are adapted to provide various functions of the distribution switch/router system 332. In one embodiment, the modules 340-345 can include instructions executable by the processing logic 334. Such instructions can be embodied in one or more programs, operating systems, databases, or any combination thereof, adapted to run at the distribution switch/router system 332. In an alternative embodiment, one or more of the functions provided by the modules 340-345 can be implemented using hardware logic, software instructions, or any combination thereof.

The memory 336 can include an A-server communication module 340 that is executable by the processing logic 334 to receive video data packets associated with a plurality of IPTV channels offered to the set-top box devices 352 from one or more A-servers (not shown). The memory 336 can include a channel caching module 341 that is executable by the processing logic 334 to cache video data received from the A-servers at a plurality of DS FIFO memories 342. Each of the DS FIFO memories 342 is associated with a particular channel.

Each of the DS FIFO memories 342 stores data packets that include random access point (RAP) packets and other data packets. An IPTV decoder at a set-top box device 352 uses a Random Access Point (RAP) as the starting frame to decode a stream of IPTV data. A RAP packet includes an I-frame combined with control data, such as a Moving Picture Experts Group (MPEG) program association table (PAT), program map table (PMT), or any combination thereof. A RAP packet can be uniquely marked via a real-time transport protocol (RTP) header extension having a signature that is detectable by the distribution switch/router system 332. For instance, the signature can include a particular pattern in the leftmost four bits of the first 32-bit word of the user datagram protocol (UDP) payload of the RAP packet.

Each RAP packet in a DS FIFO memory 342 is associated with a RAP marker. For instance, the first packet in the DS FIFO memory 342 is always a RAP packet, denoted as $RAP_1$. The other RAP packets in the FIFO can be denoted as $RAP_2, \ldots RAP_k$. Between two RAP packets are other data packets arranged according the order of their arrivals. Further, each RAP packet in a DS FIFO memory 342 is associated with a RAP timer. When the RAP timer becomes equal to a definable parameter, ("$RAP_{delay}$"), the next previous RAP packet can be aged out, such that the FIFO_Head_Pointer is moved to point to the RAP packet whose timer has become equal to the $RAP_{delay}$. For instance, RAP packets can arrive at the distribution switch/router system 332 in intervals of 0.5 seconds. $RAP_{delay}$ can be set at 1.2 seconds, such that when the $RAP_2$ timer equals 1.2 seconds, the $RAP_1$ packet is considered aged out, and the FIFO_Head_pointer can move to point to $RAP_2$. At this point, the $RAP_3$ equals approximately 0.7 seconds (i.e., 0.5 seconds less than the $RAP_2$ timer). When the $RAP_3$ timer equals 1.2 seconds, the FIFO_Head_pointer can move to point to $RAP_3$, and so on.

For each FIFO memory 342, a FIFO_Head_pointer points to a first packet in the DS FIFO memory 342, and a FIFO_Tail_pointer points to the last packet in the DS FIFO memory 342. The FIFO_Head_pointer serves as the starting point for each FIFO reading process. The FIFO_Tail_pointer is used when new packets are added to the DS FIFO memory 342. The FIFO_Tail_pointer is also used to decide whether the data in the DS FIFO memory 342 has been sent to a set-top box device 352. Each time the distribution switch/router system 332 starts to send packets from the DS FIFO memory 342 to a set-top box device 352, the DS FIFO memory 342 creates a read_pointer that is initialized at the FIFO_Head_pointer. After each packet in the DS FIFO memory 342 is sent, the read_pointer moves to the next packet in the DS FIFO memory 342. After the read_pointer points to the FIFO_Tail_pointer, the packets in the DS FIFO memory 342 have been sent to a set-top box device 352, and the reading process from the caching is completed. The read_pointer is then released.

In an illustrative, non-limiting embodiment, the distribution switch/router system 332 can allow multiple set-top box devices 352 to access the same FIFO memory 342, such that the set-top box devices 352 can receive video data associated with the same channel. In this embodiment, multiple read_pointers are created for the DS FIFO memory 342, wherein each read_pointer corresponds to one of the set-top box devices. The read_pointers can move at different paces and need not all point to the same packet in the DS FIFO memory 342, to accommodate different starting times and bandwidths associated with each set-top box device 352.

The memory 336 can also include a RAP processing module 343 that is executable by the processing logic 334 to obtain RAP data and to assign RAP markers and to start timers associated with RAP packets stored at the DS FIFO memories 342.

If a caching FIFO memory 342 exists at the distribution switch/router system 332 for a channel associated with a received packet, the channel caching module 341 is executable by the processing logic 334 to add the packet to the end of the identified FIFO memory 342. If the packet is a RAP packet, the RAP packet module 343 can be executable by the processing logic 334 to assign the RAP packet a RAP marker and to start a timer associated with the RAP packet. If no FIFO memory is maintained at the at the distribution switch/router system 332 for the channel corresponding to a received packet, then the channel caching module 341 is executable by the processing logic 334 to create a new FIFO memory. If the packet is a RAP packet, it is assigned a marker and put into the new FIFO memory with both the FIFO_Head_Pointer and FIFO_Tail_Pointer pointing to the RAP packet. If the packet is not a RAP packet, it is discarded.

Each time an IPTV multicast packet is received at the distribution switch/router system 332 from an A-server, the channel caching module 341 can be executable by the processing logic 334 to create an additional copy of the packet for channel caching. In a particular embodiment, the channel caching module 341 can be executable by the processing logic 334 to generate a caching FIFO address based on the multicast group IP address in the destination IP address header of the packet. The generated FIFO address can be used to determine whether a caching FIFO memory exists at the distribution switch/router system 332 for the channel associated with the received packet. In addition, the channel caching module 341 can be executable by the processing logic 334 to detect whether the packet is a random access point (RAP) packet.

The memory 336 includes a data forwarding module 344 executable by the processing logic 334 to send video data packets corresponding to requested channels to the access switch/router system 302. For instance, in response to receiving a rapid channel change (RCC) request from the access switch/router system 302, the data forwarding module 344 may be executable by the processing logic 334 to send a RCC stream associated with a requested channel to the access switch/router system 302 via one of the second egress queues 338. The RCC stream may include data packets from a particular DS FIFO memory 342 associated with the requested channel. In addition, the RCC stream may be sent to the access switch/router system 302 via a unicast subscriber virtual local area network (VLAN).

In an illustrative embodiment, the distribution switch/router system 332 can use a maximum available bandwidth to send packets to the access switch/router system 302, such that channel change delay can be minimized. In an illustrative, non-limiting embodiment, the distribution switch/router system 332 can dynamically adjust a data transmission rate used for the RCC stream. For example, the distribution switch/router system may select a data transmission rate for sending the RCC stream based on a data transmission rate associated with multicast data associated with the requested channel to both reduce buffering delays and improve synchronization of the RCC stream with the a multicast stream.

In another illustrative embodiment, the data forwarding module 344 can be executable by the processing logic 334 to send the RCC stream to the access switch/router system 302 at a data transmission rate that is determined based on a data transmission rate associated with the requested channel. For example, the transmission rate of the RCC stream may depend on the bandwidth associated with the requested channel. In a further illustrative embodiment, the data forwarding module 344 may be executable by the processing logic 334 to send the RCC stream at a transmission rate that depends on a predefined period of time associated with the access switch/router system 302. For example, the predefined period of time may be a period of time that elapses between the receipt of an RCC stream at the access switch/router system 302 and the merging of the RCC stream at the access switch/router system 302 with a corresponding multicast stream. To illustrate, the data forwarding module 344 may be executable by the processing logic 334 to send the RCC stream at a transmission rate that allows a certain number of cached data packets to be sent to the access switch/router system 302 before the predefined period of time expires. The number of data packets transmitted in the RCC stream may correspond to the number of data packets included in a particular DS FIFO memory 342 beginning from the first RAP packet to the last packet in the particular FIFO memory 342 at the time that the RCC request was received at the distribution switch/router system 332.

The data forwarding module 344 may be executable by the processing logic 334 to receive a multicast stream request from the access switch/router system 302. The multicast stream request may include a proxy IGMP Join packet. The data forwarding module 344 may also be executable by the processing logic 334 to send a multicast stream to the access switch/router system 302 in response to receiving the multicast stream request. The multicast stream may include data packets associated with a channel selected at a set-top box device 352. The multicast stream request may be sent to the access switch/router system 302 via a multicast virtual local area network (VLAN).

In a particular embodiment, the memory 336 may include an end of burst (EOB) module 345 that is executable by the processing logic to generate an EOB indicator and send the EOB indicator to the access switch/router system 302. The EOB indicator indicates that a last data packet of an RCC stream has been sent to the access switch/router system 302. In an illustrative, non-limiting embodiment, the EOB indicator may include a modified IGMP packet. The EOB indicator may be sent to the access switch/router system 302 via a subscriber VLAN associated with the set-top box device 352 requesting the channel. In an illustrative embodiment, the EOB module 345 may be executable by the processing logic 334 to monitor the receipt of an RCC request at the distribution switch/router system 332 and to identify the last data packet in a particular DS FIFO memory 342 associated with the requested channel at the time the RCC request was received. The EOB module 345 may be executable by the processing logic 334 to send the EOB indicator to the access switch/router system 302 after the last data packet is sent to the access switch/router system 302.

Figure 4:
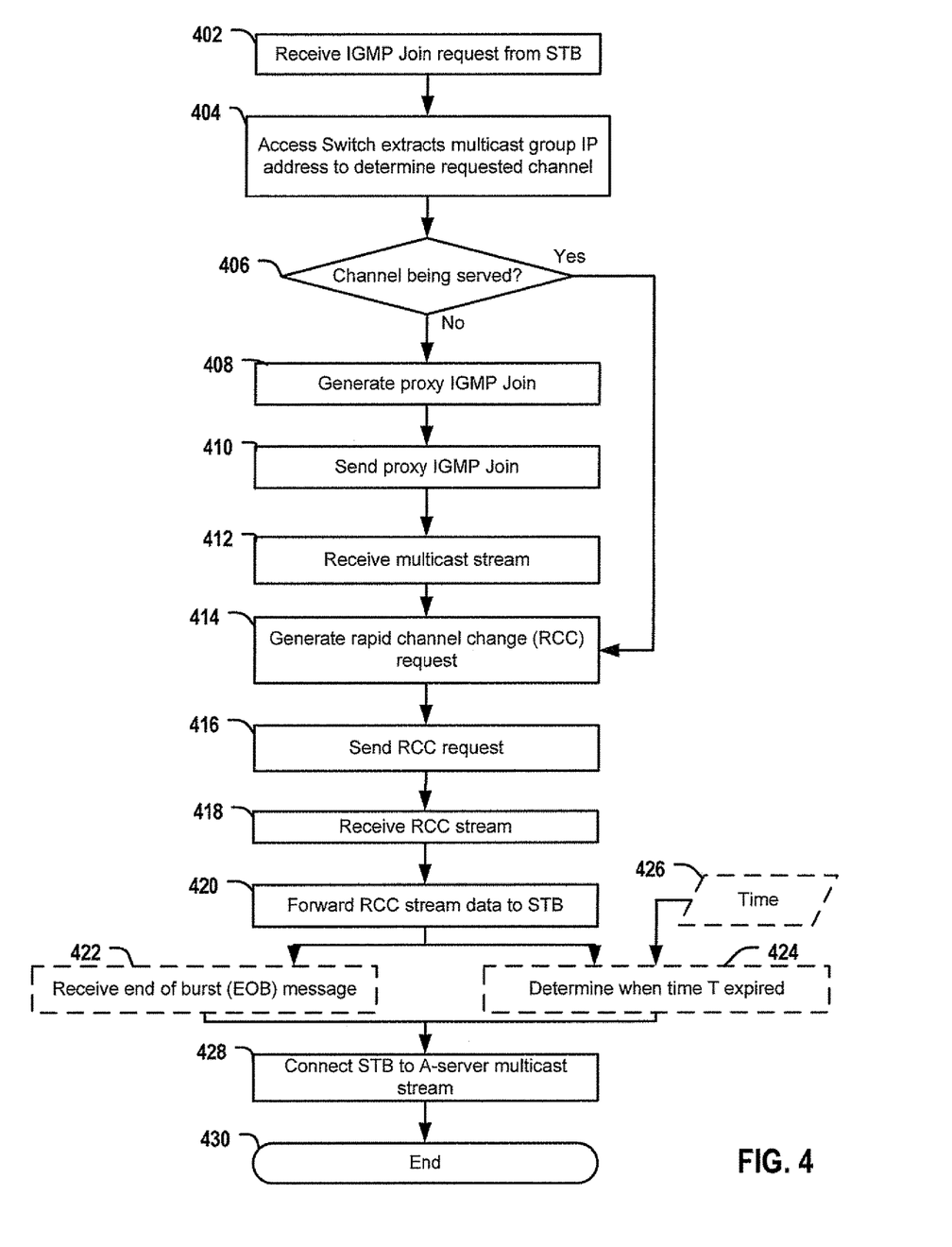
FIG. 4 is a flow diagram of a particular embodiment of a method of delivering video content.

Referring to FIG. 4, a first particular embodiment of a method of delivering video content is illustrated. At 402, an access switch/router system receives channel selection data from a set-top box device via an Internet Protocol Television (IPTV) access network. For example, can be an Internet Group Multicast Protocol (IGMP) Join request. The channel selection data indicates a selection of an IPTV channel from the set-top box device.

Moving to 402, the access switch/router system extracts a multicast group Internet Protocol (IP) address from the IGMP Join request to determine the requested channel. At 406, the access switch/router system determines whether the requested channel is being served to another set-top box device communicating with the access switch/router system. For example, the access switch/router system may determine whether it is joined to the multicast group IP address. If the requested channel is not being served to another set-top box device, the access switch/router system generates a proxy IGMP Join request associated with the requested channel, at 408, and generates a rapid channel change (RCC) request associated with the channel, at 414. The access switch/router system sends the proxy IGMP Join request via a multicast virtual local area network (VLAN) connection to a distribution switch/router system at 410. It sends the RCC request via the per subscriber virtual local area network (VLAN) connection to a distribution switch/router system at 416. The multicast VLAN includes a data link used for multicast communications between the distribution switch/router system and the access switch/router system. After receiving the IGMP Join request, the distribution switch/router system joins the access switch/router system to the multicast group associated with the requested channel and the access switch/router system receives the multicast stream, at 412. The subscriber VLAN may be a communication link between the access switch/router system and the distribution switch/router system used for communications related to the particular set-top box device. Moving to 418, the access switch/router system receives a RCC stream from the distribution switch/router system via the subscriber VLAN. The RCC stream includes video data packets associated with the selected IPTV channel that were cached at the distribution switch/router system. The access switch/router system forwards the video data packets of the RCC stream to the set-top box device, at 420.

If the requested channel is being served to another set-top box device, the access switch/router system generates a rapid channel change (RCC) request associated with the channel, at 414. The RCC request is based at least partially on the channel selection data. For example, the RCC request may identify the requested channel and the set-top box device requesting the channel. At 416, the access switch/router system sends the RCC request to a distribution switch/router system via a subscriber virtual local area network (VLAN) associated with the set-top box device. The subscriber VLAN may be a communication link between the access switch/router system and the distribution switch/router system used for communications associated with a particular subscriber. Moving to 418, the access switch/router system receives a RCC stream from the distribution switch/router system via the subscriber VLAN. The RCC stream includes video data packets associated with the selected IPTV channel that were cached at the distribution switch/router system. The access switch/router system forwards the video data packets of the RCC stream to the set-top box device, at 420.

FIG. 4 is not intended to indicate that activities depicted necessarily occur sequentially or in a particular order. For example, if, at 406, the requested channel is not being served to another set-top box device, the access switch/router system may generate a rapid channel change (RCC) request associated with the channel, at 414, and genate a proxy IGMP Join concurrently. Likewise, the access switch/router system may send the proxy IGMP Join, at 410, and send the RCC request, at 416, concurrently. The multicast stream and RCC stream may be receive concurrently or in any order.

The method illustrated in FIG. 4 depicts two ways of merging the RCC stream and the multicast stream. In a first illustrative embodiment, at 422, the access switch/router system may send RCC stream data to the set-top box device until an end of burst (EOB) indicator is received from the distribution switch/router system via the subscriber VLAN. The EOB indicator indicates to the access switch/router system that a last video data packet of the RCC stream has been received. In a particular illustrative embodiment, the EOB indicator includes or is part of a modified IGMP packet. For example, the EOB indicator may be one or more designated bits of the IGMP packet. After the EOB indicator is received, the access switch/router system may connect the set-top box device to the multicast stream from the A-server, at 428.

In a second illustrative embodiment, at 424, a time period 426 may be defined at the access switch/router system. The time period 426 may be associated with a known, expected, measured or otherwise approximated data transmission rate of the multicast stream. The access switch/router system may estimate that a last data packet of the RCC stream is received when the time period 426 has expired. When the access switch/router system determines, at 424, that the time period 426 has expired, the access switch/router system may connect the set-top box device to the multicast stream, at 428. The method terminates at 430.

Figure 5:
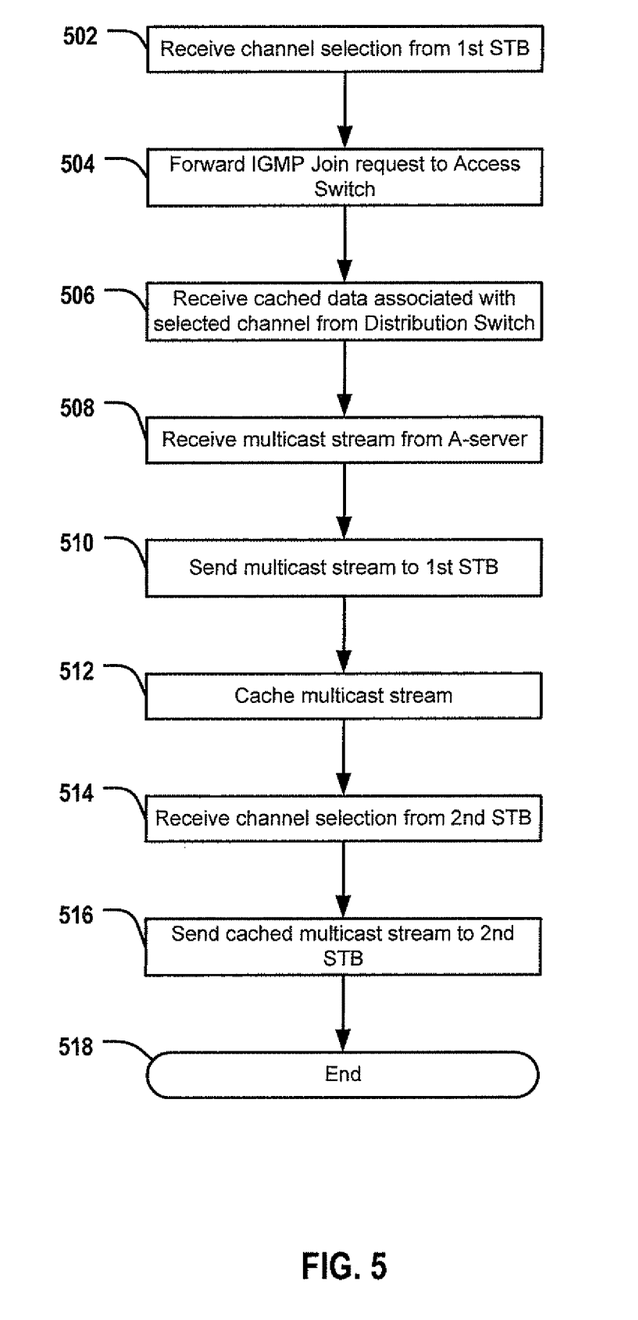
FIG. 5 is a flow diagram of a second particular embodiment of a method of delivering video content.

Referring to FIG. 5, a second particular embodiment of a method of delivering video content is illustrated. At 502, first channel selection data is received at a residential gateway device from a first set-top box device. The first channel selection data may include an Internet Group Multicast Protocol (IGMP) Join request indicating the selected channel. Moving to 504, the residential gateway device forwards the IGMP Join request to an access switch/router system via an Internet Protocol Television (IPTV) access network. At 506, the residential gateway device receives cached data associated with the selected channel from a distribution switch/router system via the access switch/router system. Proceeding to 508, the residential gateway receives a multicast stream from an A-server via the access switch/router system. At 510, the residential gateway sends the data packets associated with the multicast stream to the first set-top box device.

In a particular embodiment, at 512, the residential gateway caches data packets associated with the multicast stream in a First in-First out (FIFO) cache. At 514, the residential gateway receives second channel selection data from a second set-top box device. If the second channel selection data indicates the same channel as the first channel selection data, the residential gateway sends the data packets associated with the cached multicast stream to the second set-top box device, at 516. The method terminates at 518.

Figure 6:
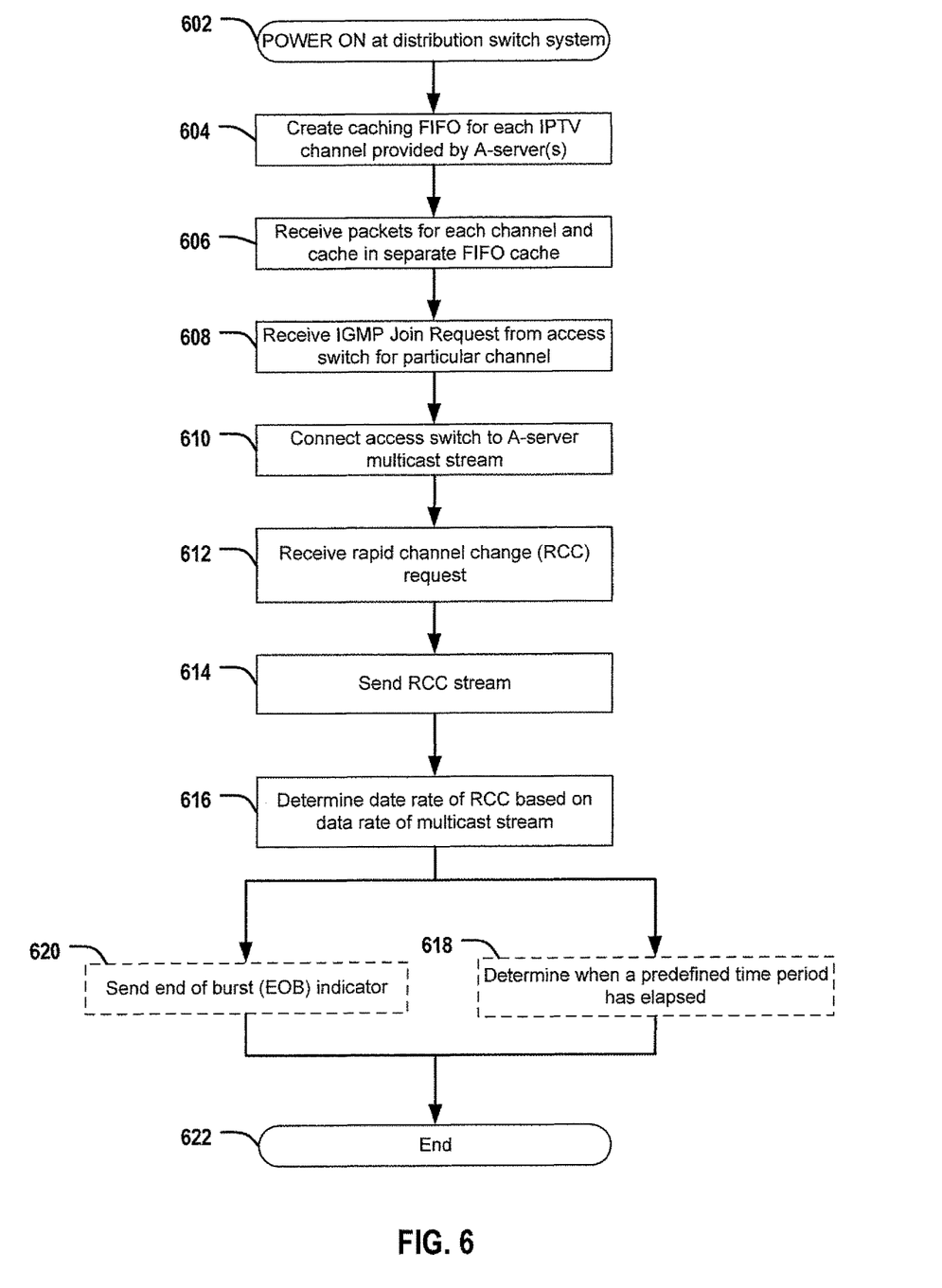
FIG. 6 is a flow diagram of a third particular embodiment of a method of delivering video content.

Referring to FIG. 6, a third particular embodiment of a method of delivering video content is illustrated. At 602, a distribution switch/router system powers on. The distribution switch/router system can include one or more servers, one or more routers, one or more switches, or any combination thereof. Moving to 604, the distribution switch/router system creates a caching first-in first-out memory (FIFO) for each Internet Protocol Television (IPTV) channel provided by one or more video acquisition servers (A-servers) communicating with the distribution switch/router system. Proceeding to 606, the distribution switch/router system receives packets associated with each channel from the A-server(s) and caches the packets for each channel in a separate caching FIFO.

Continuing to 608, the distribution switch/router system receives a proxy Internet Group Multicast Protocol (IGMP) Join request from an access switch/router system indicating a channel requested by a set-top box device. Advancing to 610, the distribution switch/router system connects the access switch/router system with an A-server multicast stream for the channel.

At 612, the distribution switch/router system receives a rapid channel change (RCC) request from the access switch/router system. Continuing to 614, the distribution switch/router system sends an RCC stream including cached packets of the indicated channel to the access switch/router system via a virtual local area network (VLAN) associated with a subscriber. Advancing to 616, the distribution switch/router system determines a data rate at which to send the RCC stream based on a data rate of the multicast stream. For example, the data rate of the RCC stream may be adjusted to be (1+E) times the data rate of the multicast stream, where E is an overhead factor. The overhead factor, E, can be with a range from 0 to 1, more particularly, from about 0.2 to 1. The overhead factor E is selected to reduce the channel change latency and to avoid exceeding bandwidth available for the RCC stream.

In a particular embodiment, the distribution switch/router system determines when a predefined time period has elapsed, at 618, and ends the RCC stream based on the expiration of the predefined time period. The predefined time period may be selected such that the RCC stream and multicast stream are approximately synchronized at the expiration of the time period. In another particular embodiment, the distribution switch/router system may send an end of burst (EOB) indicator to the access switch/router to indicate the end of the RCC stream. The method terminates at 622.

Figure 7:
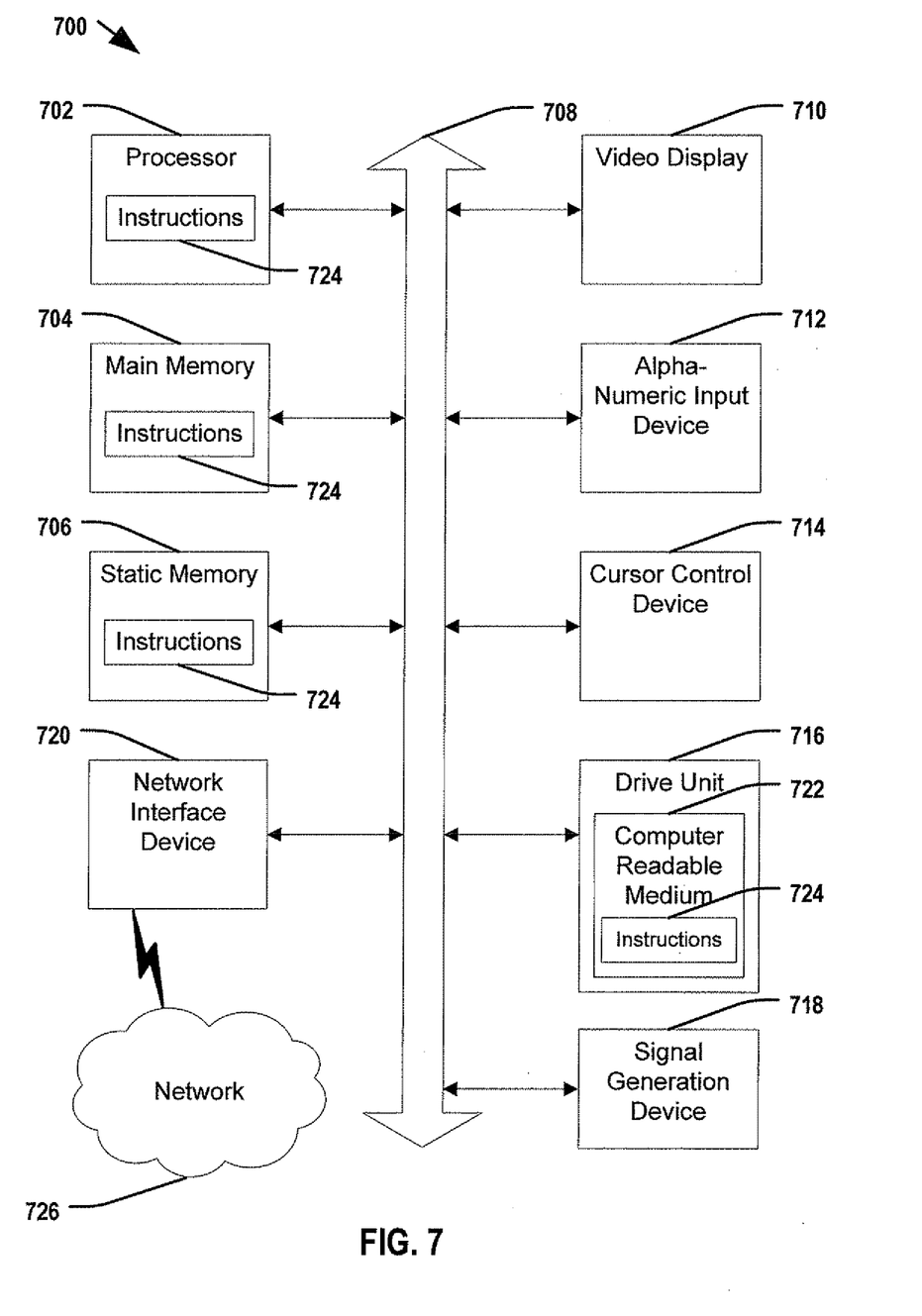
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices, such as access switch/router system systems (including servers, switches, routers, or any combination thereof), distribution switch/router system systems (including servers, switches, routers, or any combination thereof), video acquisition servers, set-top box devices, D-server, or other servers or systems, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of delivering video content, the method comprising:
   receiving, at an access system, channel selection data from a set-top box device via a television access network, the channel selection data indicating selection of a selected television channel;
   in response to receiving the channel selection data, generating, at the access system, a rapid channel change request based on the channel selection data, wherein the rapid channel change request requests a unicast stream of the selected television channel, and wherein a corresponding rapid channel change request that requests a corresponding unicast stream is generated each time a particular television channel is selected;
   in response to receiving the channel selection data, generating, at the access system, a multicast stream request when the access system is not already serving a multicast stream associated with the selected television channel, wherein the multicast stream request is based on the channel selection data;
   sending the rapid channel change request from the access system to a distribution system distinct from the access system via a virtual local area network after receiving the channel selection data;
   when the access system is not already serving the multicast stream associated with the selected television channel, sending the multicast stream request to the distribution system via a multicast virtual local area network; and
   receiving, at the access system, the unicast stream from the distribution system via the virtual local area network in response to the rapid channel change request, the unicast stream including video data packets associated with the selected television channel.

2. The method of claim 1, wherein the television access network is an internet protocol television network and wherein the rapid channel change request identifies data to be sent from the distribution system to the access system.

3. The method of claim 1, further comprising forwarding the video data packets of the unicast stream from the access system to the set-top box device.

4. The method of claim 3, further comprising:
   receiving an end of burst indicator from the distribution system via the virtual local area network, the end of burst indicator indicating that a last video data packet of the unicast stream has been sent; and
   sending the video data packets associated with the selected television channel via the multicast stream to the set-top box device after receiving the end of burst indicator.

5. The method of claim 4, wherein the end of burst indicator is an Internet Group Management Protocol packet.

6. The method of claim 1, further comprising receiving the multicast stream from the distribution system via the multicast virtual local area network, the multicast stream including a set of video data packets of the selected television channel.

7. The method of claim 1, wherein the rapid channel change request identifies a predefined period of time associated with the rapid channel change request.

8. The method of claim 6, wherein the rapid channel change request comprises a modified Internet Group Management Protocol join request associated with the selected television channel and associated with the set-top box device.

9. A method of delivering video content, the method comprising:
   receiving, at a distribution system distinct from an access system, a rapid channel change request from the access system via virtual local area network, the rapid channel change request sent in response to the access system receiving channel selection data from a set-top box device via a television access network, the channel selection data indicating selection of a selected television channel, wherein the rapid channel change request requests a unicast stream of the selected television channel, and wherein a corresponding rapid channel change request that requests a corresponding unicast stream is received at the distribution system each time the access system receives particular channel selection data from a particular set-top box device;

in response to receiving the rapid channel change request, sending the unicast stream to the access system via the virtual local area network, wherein the unicast stream includes video data packets associated with the selected television channel stored at the distribution system;

receiving a multicast stream request from the access system via a multicast virtual local area network when the access system is not already serving a multicast stream associated with the selected television channel, the multicast stream request sent in response to the channel selection data, wherein the multicast stream request is based on the channel selection data; and in response to receiving the multicast stream request, sending the multicast stream to the access system via the multicast virtual local area network, the multicast stream including video data packets of the selected television channel.

10. The method of claim 9, further comprising sending an end of burst indicator to the access system after a last video data packet of the unicast stream is sent to the access system.

11. The method of claim 9, further comprising:
determining a first data transmission rate associated with the multicast stream; and
sending the unicast stream at a second data transmission rate, wherein the second data transmission rate is based on the first data transmission rate.

12. A system to deliver video content, the system comprising:
an access system having processing logic and memory accessible to the processing logic, wherein the memory includes instructions executable by the processing logic to perform operations including:
receiving channel selection data from a set-top box device, the channel selection data indicating selection of a selected television channel;
generating a rapid channel change request, in response to receiving the channel selection data and based on the channel selection data, wherein the rapid channel change request indicates the selected television channel, and wherein a corresponding rapid channel change request that requests a corresponding unicast stream is generated each time a particular television channel is selected;
generating a multicast stream request in response to receiving the channel selection data when the access system is not already serving a multicast stream associated with the selected television channel, wherein the multicast stream request is based on the channel selection data;
sending the rapid channel change request to a distribution system distinct from the access system via a virtual local area network;
sending the multicast stream request to the distribution system via a multicast virtual local area network when the access system is not already serving the multicast stream associated with the selected television channel; and
receiving the unicast stream from the distribution system via the virtual local area network, wherein the unicast stream includes video data packets associated with the selected television channel.

13. The system of claim 12, wherein the operations further include forwarding the video data packets of the unicast stream to the set-top box device.

14. The system of claim 12, wherein the operations further include determining when a particular period of time has elapsed, wherein the particular period of time is associated with the rapid channel change request.

15. The system of claim 14, wherein the operations further include sending the multi cast stream associated with the selected television channel to the set-top box device after the particular period of time has elapsed.

16. The system of claim 14, wherein the operations further include stopping the unicast stream from being sent to the set-top box device after the particular period of time has elapsed.

17. The system of claim 12, wherein the operations further include communicating with the distribution system via a plurality of virtual local area networks, wherein each virtual local area network of the plurality of virtual local area networks is associated with one of a plurality of set-top box devices coupled to the access system.

18. A system to deliver video content, the system comprising:
a distribution system distinct from an access system, wherein the distribution system includes processing logic and memory accessible to the processing logic, and wherein the memory includes instructions executable by the processing logic to perform operations including:
receiving a rapid channel change request from the access system via a virtual local area network, the rapid channel change request sent in response to the access system receiving channel selection data from a set-top box device via a television access network, the channel selection data indicating selection of a selected television channel, wherein the rapid channel change request requests a unicast stream of the selected television channel, and wherein a corresponding rapid channel change request that requests a corresponding unicast stream is received by the distribution system each time the access system receives particular channel selection data;
sending a rapid channel change stream, in response to receiving the rapid channel change request, to the access system via the virtual local area network, wherein the rapid channel change stream includes video data packets associated with the selected television channel;
receiving a multicast stream request from the access system via a multicast virtual local area network when the access system is not already serving a multicast stream associated with the selected television channel, the multicast stream request sent in response to the access system receiving the channel selection data from the set-top box device via the television access network, wherein the multicast stream request is based on the channel selection data; and
sending the multicast stream, in response to receiving the multicast stream request, to the access system via the multicast virtual local area network, the multicast stream including a set of video data packets of the selected television channel.

19. The system of claim 18, wherein the operations further include determining when a particular period of time associated with the rapid channel change request has elapsed.

20. The system of claim 19, wherein the operations further include sending the rapid channel change stream to the access system at a data transmission rate sufficient to send all of the video data packets of the rapid channel change stream before the particular period of time has elapsed.

21. The system of claim 18, further comprising an interface to communicate with a plurality of first-in first-out caches, wherein each first-in first-out cache of the plurality of first-in-first-out caches is adapted to store video data packets associated with one of a plurality of television channels.

22. The system of claim 21, wherein the plurality of first-in first-out caches is stored at the distribution system.

23. The system of claim 21, wherein the plurality of first-in first-out caches is stored at a rapid channel change device adapted to communicate with the distribution system.

24. The system of claim 21, wherein the plurality of first-in first-out caches is stored at an expansion card coupled to the distribution system.

25. The system of claim 18, wherein the distribution system includes a core network interface to receive video data packets of each of a plurality of television channels from a video acquisition server via the television access network and wherein the television access network is an internet protocol television network.

26. A computer-readable storage device having instructions executable by a processor to perform operations comprising:
  receiving channel selection data from a set-top box device via a television access network, the channel selection data indicating selection of a selected television channel;
  in response to receiving the channel selection data, generating a rapid channel change request based on the channel selection data, wherein the rapid channel change request requests a unicast stream of the selected television channel, and wherein a corresponding rapid channel change request that requests a corresponding unicast stream is generated each time a particular television channel is selected;
  in response to receiving the channel selection data, generating a multicast stream request when a determination by the processor indicates that a multicast stream associated with the selected television channel is not being received, wherein the multicast stream request is based at least partially on the channel selection data;
  sending the rapid channel change request to a distribution system via a virtual local area network;
  when the determination indicates that the multicast stream associated with the selected television channel is not being received, sending the multicast stream request to the distribution system via a multicast virtual local area network; and
  receiving the unicast stream from the distribution system via the virtual local area network, the unicast stream including video data packets associated with the selected television channel.

27. The computer-readable storage device of claim 26, wherein the channel selection data comprises an Internet Group Management Protocol join request related to a multicast group associated with the selected television channel.

28. The computer-readable storage device of claim 27, wherein generating the rapid channel change request comprises modifying a type field of the Internet Group Management Protocol join request.

29. The method of claim 9, further comprising determining when a particular period of time associated with the rapid channel change request has elapsed.

30. The method of claim 29, wherein the unicast stream is sent at a data transmission rate sufficient to send all of the video data packets of the unicast stream before the particular period of time has elapsed.

31. The method of claim 1, further comprising connecting the set-top box device to the multicast stream without generating the multicast stream request when the access system is already serving the multicast stream to a second set-top box device when the channel selection data is received.

32. The method of claim 1, wherein the multicast stream request is generated at the access system when the access system is not already serving the multicast stream to a second set-top box device that is distinct from the set-top box device.

33. The method of claim 1, wherein the rapid channel change request is generated by modifying the multicast stream request.

* * * * *